(12) United States Patent
Kuipers et al.

(10) Patent No.: US 9,050,999 B2
(45) Date of Patent: Jun. 9, 2015

(54) SYSTEM WITH SMART STEERING FORCE FEEDBACK

(71) Applicant: Caterpillar Inc., Peoria, IL (US)

(72) Inventors: Beau Daniel Kuipers, Morris, IL (US); Edward William Mate, Manhattan, IL (US); David Arthur Mork, Yorkville, IL (US)

(73) Assignee: Caterpillar Inc, Peoria, IL (US)

( * ) Notice: Subject to any disclaimer, the term of this patent is extended or adjusted under 35 U.S.C. 154(b) by 78 days.

(21) Appl. No.: 13/750,635

(22) Filed: Jan. 25, 2013

(65) Prior Publication Data

US 2014/0214278 A1     Jul. 31, 2014

(51) Int. Cl.

| B62D 6/00 | (2006.01) |
|---|---|
| B62D 6/06 | (2006.01) |
| B62D 6/10 | (2006.01) |
| G05D 1/00 | (2006.01) |
| G05B 13/00 | (2006.01) |
| G05D 3/12 | (2006.01) |

(52) U.S. Cl.
CPC *B62D 6/008* (2013.01); *G05D 3/12* (2013.01); *G05D 1/00* (2013.01); *G05B 13/00* (2013.01)

(58) Field of Classification Search
CPC .......... G05D 1/00; G05D 3/12; G05B 13/00; B62D 6/008
USPC ............ 701/42; 318/561; 180/6.2, 6.24, 6.62, 180/446
See application file for complete search history.

(56) References Cited

U.S. PATENT DOCUMENTS

| 5,219,035 | A | * | 6/1993 | Tsurumiya et al. ........... 180/412 |
|---|---|---|---|---|
| 5,489,005 | A | | 2/1996 | Marcott et al. |
| 5,513,720 | A | * | 5/1996 | Yamamoto et al. .......... 180/421 |
| 6,082,482 | A | * | 7/2000 | Kato et al. .................... 180/402 |
| 6,097,286 | A | | 8/2000 | Discenzo |
| 6,176,341 | B1 | | 1/2001 | Ansari |
| 6,389,343 | B1 | | 5/2002 | Hefner et al. |
| 6,535,806 | B2 | | 3/2003 | Millsap et al. |
| 6,557,662 | B1 | | 5/2003 | Andonian et al. |
| 6,678,596 | B2 | | 1/2004 | Husain et al. |
| 6,755,276 | B2 | | 6/2004 | Clephas |
| 6,761,243 | B2 | | 7/2004 | Stout et al. |
| 6,778,889 | B2 | | 8/2004 | Kato et al. |
| 6,820,713 | B2 | | 11/2004 | Menjak et al. |
| 6,973,989 | B2 | | 12/2005 | Williams |
| 7,092,805 | B2 | | 8/2006 | Kasahara et al. |
| 7,200,993 | B2 | | 4/2007 | Khalil et al. |

(Continued)

FOREIGN PATENT DOCUMENTS

EP       1227027       7/2002

*Primary Examiner* — Mary Cheung
*Assistant Examiner* — Frederick Brushaber
(74) *Attorney, Agent, or Firm* — Finnegan, Henderson, Farabow, Garrett & Dunner, LLP (57) ABSTRACT

A steering system and method for providing a force feedback to an operator input device are disclosed. The method may determine an actual position of the operator input device. The method may determine a desired steering mechanism position of a steering mechanism based on the actual position of the operator input device. The method may determine an actual steering mechanism position of the steering mechanism. The method may compare the actual steering mechanism position to the desired steering mechanism position and to a previous desired steering mechanism position. The method may generate a command that selectively activates force feedback to the operator input device based on the comparison.

20 Claims, 3 Drawing Sheets

(56) References Cited

U.S. PATENT DOCUMENTS

| | | |
|---|---|---|
| 7,434,653 B2 | 10/2008 | Khalil et al. |
| 7,516,812 B2 | 4/2009 | Hara et al. |
| 7,675,258 B2 | 3/2010 | Dattilo et al. |
| 7,881,841 B2 | 2/2011 | Dattilo et al. |
| 7,908,056 B2 | 3/2011 | Hwang |
| 7,980,352 B2 | 7/2011 | Wetterer et al. |
| 8,380,398 B2 * | 2/2013 | Kariatsumari et al. ......... 701/41 |
| 8,417,396 B2 * | 4/2013 | Goodman et al. ................ 701/3 |
| 8,448,741 B2 | 5/2013 | Breiner et al. |
| 2004/0143393 A1 * | 7/2004 | Knecht et al. ................ 701/301 |
| 2004/0200661 A1 * | 10/2004 | Sugitani et al. ............... 180/402 |
| 2004/0238258 A1 * | 12/2004 | Ono et al. ..................... 180/402 |
| 2005/0039971 A1 * | 2/2005 | Fujioka et al. ................ 180/402 |
| 2006/0004496 A1 * | 1/2006 | Tucker et al. ..................... 701/4 |
| 2006/0060412 A1 | 3/2006 | Bolourchi et al. |
| 2007/0020588 A1 * | 1/2007 | Batcheller et al. .............. 434/30 |
| 2008/0162000 A1 * | 7/2008 | Dattilo et al. ................... 701/42 |
| 2008/0230300 A1 | 9/2008 | Hara et al. |
| 2010/0235049 A1 * | 9/2010 | Kariatsumari et al. ......... 701/41 |
| 2011/0066362 A1 * | 3/2011 | He ................ 701/120 |
| 2011/0316857 A1 * | 12/2011 | Pepitone et al. .............. 345/467 |
| 2012/0010763 A1 * | 1/2012 | Goodman et al. ................ 701/2 |
| 2012/0111658 A1 | 5/2012 | Hori et al. |

* cited by examiner

SYSTEM WITH SMART STEERING FORCE FEEDBACK

TECHNICAL FIELD

The present disclosure relates generally to methods and systems for steering, and more particularly, to methods and systems for steering having smart steering force feedback.

BACKGROUND

Machines such as, for example, cars, trucks, wheel loaders, backhoes, and tractors, include motion-control systems that have one or more moveable input devices that regulate the motion of one or more moveable components, such as ground wheels of a machine. Some such motion-control systems include an operator interface associated with the moveable input device, such as a joystick, steering wheel, or a pedal, that an operator uses to provide input to the motion-control system. In some cases, such an operator input device provides inputs to regulate the motion of the moveable components through a mechanical connection. Such mechanical connections can transmit force feedback from the moveable components to the operator input device. Other motion control systems use means other than a mechanical connection to transmit input from the operator input device to the moveable components of the motion-control system, such as electrical signals (steer-by-wire type steering system). Some of these steer-by-wire steering systems provide force feedback to the operator manipulating the operator input device by, for example, calculating an error between the position of the operator input device and the position of the moveable components and applying a force feedback.

In some situations, certain types of force feedback between the moveable components and the operator input device may be undesirable. For example, the moveable components connected to the operator input device may be ground wheels of a machine. When the ground wheels encounter a significant obstruction or imperfection in the road, the operator may feel a kickback through the operator input device. The force of this kickback can be large and sudden, and a potential hazard for the operator of the machine. Furthermore, the operator tends to over-correct the operator input device in response to such sudden movements of the operator input device, resulting in suboptimal steering. Mechanical steering systems have various means of preventing such kickback. Electrical steering systems that provide force feedback based on error between the position of the operator input device and the position of the moveable components are not equipped with a suitable way to prevent such kickback. However, it might be desirable or necessary to prevent such kickback forces being transmitted to the operator input device in such systems.

An exemplary system that may be utilized to reduce the transmission of kickback to the operator input device in an electrical steering system is disclosed in U.S. Pat. No. 7,516,812 to Hara et al. that issued on Apr. 14, 2009 (the '812 patent). The system of the '812 patent is capable of increasing the steering reaction force in a steering wheel in response to road surface reaction forces on ground wheels when the steering wheel is turning, and decreasing the steering reaction force in response to the road surface force when the steering wheel is returning. The system mitigates changes in the steering force accompanying shocks from transient increases in road surface reaction forces such that the operator can smoothly return back the steering wheel to the center position.

Although the system of '812 patent may be useful for allowing a smooth return of the steering wheel by decreasing the influence of ground-induced forces on the steering reaction force during the period of return for the steering wheel, the system does not remove kickback to the operator input device during all circumstances, while still providing for force feedback to the operator input device when kickback is not occurring.

The disclosed steering system is directed to overcoming one or more of the problems set forth above and/or other problems of the prior art.

SUMMARY

In one aspect, the present disclosure is directed to a method for providing a force feedback to an operator input device. The method may include determining an actual position of the operator input device. The method may also include determining a desired steering mechanism position of a steering mechanism based on the actual position of the operator input device. The method may further include determining an actual steering mechanism position of the steering mechanism. The method may also include comparing the actual steering mechanism position to the desired steering mechanism position and to a previous desired steering mechanism position. The method may also include generating a command that selectively activates force feedback to the operator input device based on the comparison.

In another aspect, the present disclosure is directed to a force feedback control system for providing a force feedback to an operator input device. The control system may include one or more memories storing instructions, and one or more processors configured to execute the instructions to perform operations. For example, the one or more processors may determine an actual position of the operator input device. The one or more processors may also determine a desired steering mechanism position of a steering mechanism based on the actual position of the operator input device. The one or more processors may also determine an actual steering mechanism position of the steering mechanism. The one or more processors may further compare the actual steering mechanism position to the desired steering mechanism position and to a previous desired steering mechanism position. The one or more processors may also generate a command that selectively activates the force feedback to the operator input device based on the comparison.

In yet another aspect, the present disclosure is directed to a steering system. The steering system may include an operator input device configured to control one or more traction devices of a machine. The steering system may include a steering mechanism associated with the operator input device, configured to move the one or more traction devices according to the operator input device. The steering system may also include one or more position sensors associated with the operator input device. The steering system may further include a controller. The controller may be configured to determine an actual position of the operator input device by using the one or more position sensors associated with the operator input device, and determine a desired steering mechanism position of a steering mechanism based on the actual position of the operator input device. The controller may be further configured to determine an actual steering mechanism position of the steering mechanism, and compare the actual steering mechanism position to the desired steering mechanism position and to a previous desired steering mechanism position. The controller may also be configured to generate a command that selectively activates the force feedback to the operator input device based on the comparison.

DETAILED DESCRIPTION

Figure 1:
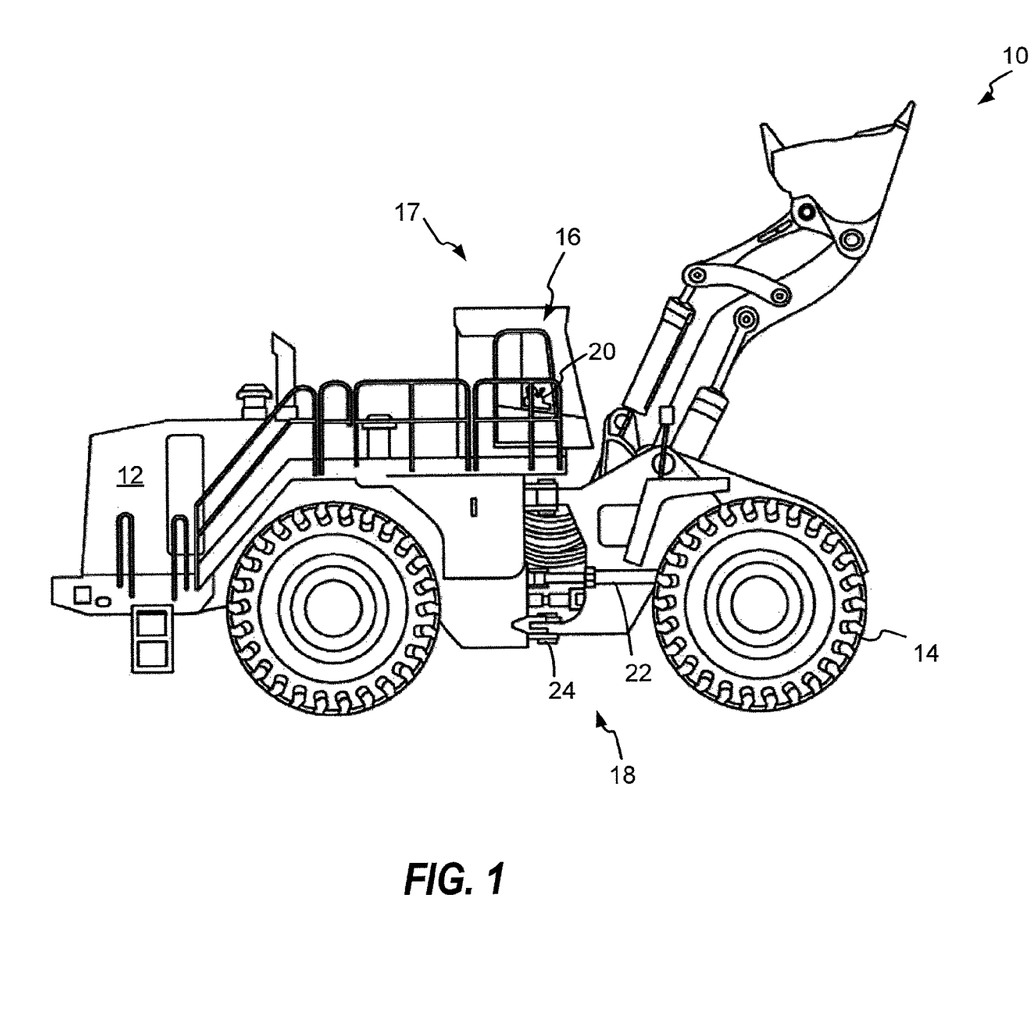
FIG. 1 is a diagrammatic illustration of a machine having an exemplary disclosed steering system.

FIG. 1 illustrates an exemplary machine 10. Machine 10 may be a mobile machine that performs some type of operation associated with an industry such as mining, construction, farming, or any other industry, at a worksite. For example, machine 10 may be an earth moving machine such as wheel loader, a haul truck, a backhoe, a lift truck, or any other operation-performing machine. Machine 10 may include a power source 12, at least one traction device 14, an operator station 16, and a steering system 17.

Power source 12 may be an engine, for example, a diesel engine, a gasoline engine, a gaseous fuel power engine such as a natural gas engine, or any other type of engine otherwise known in the art. Power source 12 may alternatively embody a non-combustion source of power, such as a fuel cell, a power storage device, an electric motor, or other similar mechanisms. Power source 12 may be connected to drive traction device 14, thereby propelling machine 10.

Traction device 14 may include wheels located on each side of machine 10 (only one side shown). Alternatively, fraction device 14 may include tracks, belts, or other known traction devices. Any of the wheels on machine 10 may be driven and/or steered, e.g., by use of an operator input device, discussed below.

Operator station 16 may include devices that receive input from a machine operator indicative of a desired steering maneuver. Specifically, operator station 16 may include one or more operator input devices 20, such as a steering wheel, single or multi-axis joysticks, or other known steering devices. Operator input device 20 may be proportional-type controllers configured to orient machine 10 by producing steering position and/or steering velocity signals that are indicative of a desired machine steering maneuver. Operator input device 20 may be in communication with, part of, and/or otherwise associated with steering system 17.

Steering system 17 may also include steering mechanism 18, which may include one or more hydraulic cylinders 22 located on each side of machine 10 that function in cooperation with a centrally-located articulated axis 24. To affect steering, hydraulic cylinder 22 located on one side of machine 10 may extend while the hydraulic cylinder 22 located on the opposite side of machine 10 simultaneously retracts, thereby causing a forward end of machine 10 to pivot about centrally-located articulated axis 24 relative to a back end of machine 10. Alternatively, steering mechanism 18 may include a greater or lesser number of hydraulic cylinders 22, and/or a different configuration of hydraulic cylinders 22 may be implemented. In some embodiments, hydraulic cylinders 22 may be implemented to have a direct connection to one or more steerable traction devices 14 of machine 10. In other embodiments, hydraulic cylinder 22 may be connected to a steering linkage 47 (not shown in FIG. 1, shown in FIG. 2) that transmits movement of hydraulic cylinder to the front wheels, such that the front wheels turn relative to a body of machine 10. Steering linkage 47 may include a combination of rods and levers configured to translate the movement of hydraulic cylinder 22 to the turning of traction device 14.

The extension and retraction of hydraulic cylinders 22 may be achieved by creating an imbalance of force on a piston assembly disposed within a tube of each hydraulic cylinder 22. Specifically, each of hydraulic cylinders 22 may include a first chamber and a second chamber separated by the piston assembly. The piston assembly may include two opposing hydraulic surfaces, one associated with each of the first and second chambers. The first and second chambers may be selectively supplied with a pressurized fluid and drained of the pressurized fluid to create an imbalance of force on the two surfaces that causes the piston to axially displace within the tube.

Figure 2:
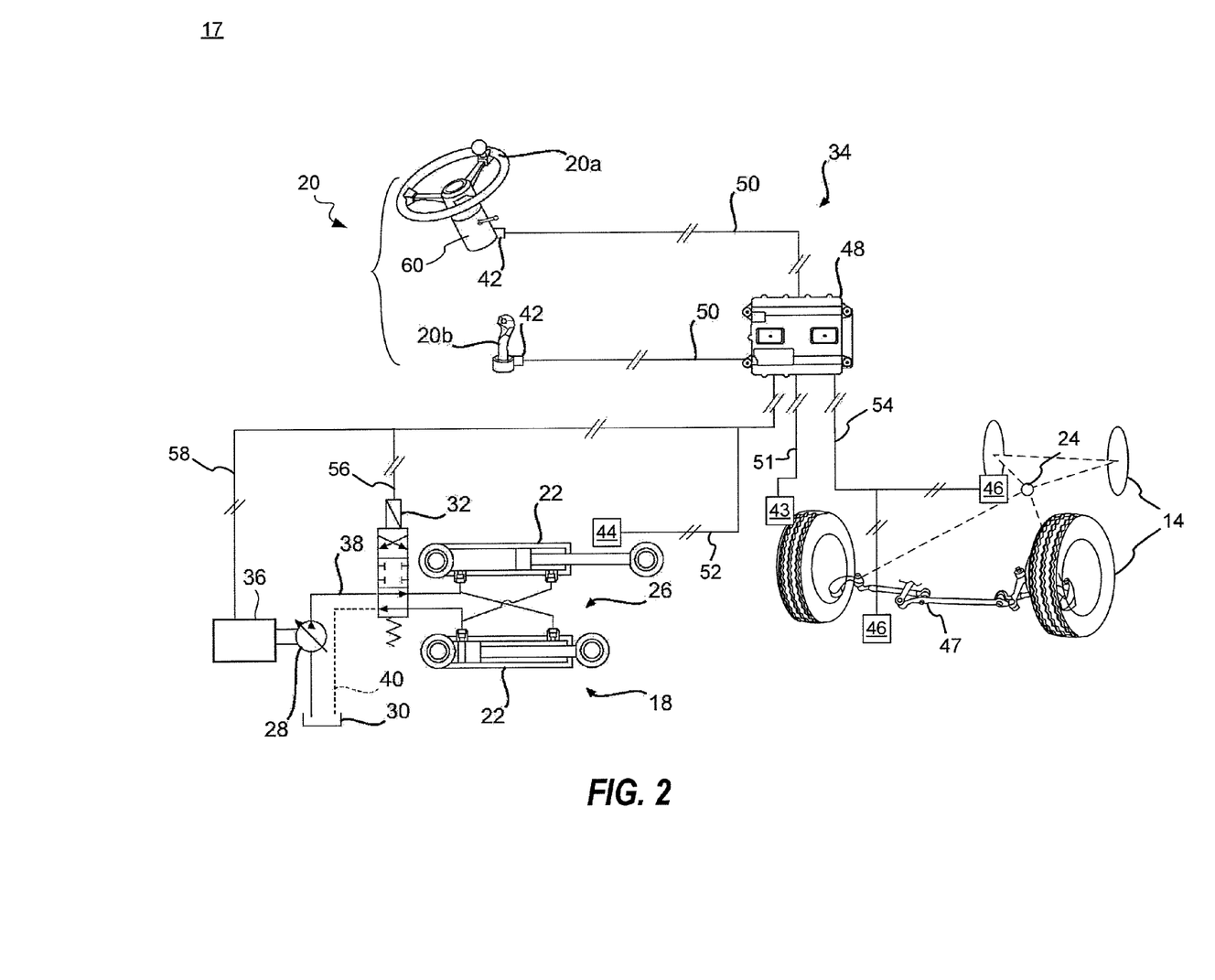
FIG. 2 is a diagrammatic illustration of the exemplary disclosed steering system of the machine of FIG. 1.

As illustrated in FIG. 2, steering system 17 may also include a hydraulic circuit 26 configured to selectively supply fluid to and drain from hydraulic cylinders 22, thereby steering machine 10. Hydraulic circuit 26 may include a source 28 of pressurized fluid, a tank 30, a steering control valve 32, and a control sub-system 34. In various embodiments, hydraulic circuit 26 may include additional or different components than those illustrated in FIG. 2 and listed above, such as, for example, accumulators, check valves, pressure relief or makeup valves, pressure compensating elements, restrictive orifices, and other hydraulic components known in the art.

Source 28 may produce a flow of pressurized fluid and include a variable displacement pump, a fixed displacement pump, a variable flow pump, and/or any other source of pressurized fluid known in the art. Source 28 may be drivably connected to a motor 36, such as an electric motor or an internal combustion engine. Although FIG. 2 illustrates source 28 as being dedicated to supplying pressurized fluid to only hydraulic circuit 26, source 28 may alternatively supply pressurized fluid to additional machine hydraulic circuits.

Tank 30 may embody a reservoir configured to hold a supply of fluid. The fluid may include, for example, an engine lubrication oil, a transmission lubrication oil, a separate hydraulic oil, or any other fluid known in the art. Source 28 may draw fluid from and return fluid to tank 30. In various embodiments, source 28 may be connected to multiple separate fluid tanks.

Steering control valve 32 may be connected to source 28 via a supply line 38, and to tank 30 via a drain line 40 to control actuation of hydraulic cylinders 22. Steering control valve 32 may include at least one valve element that functions to meter pressurized fluid to one of the first and second chambers within hydraulic cylinder 22, and to simultaneously allow fluid from the other of the first and second chambers to drain to tank 30. In one example, the valve element of steering control valve 32 may be a solenoid valve that mechanically opens and closes a valve based on an electric signal controlled by controller 48. In another example, steering control valve 32 may be a hydraulic pilot-actuated valve. In a further example, steering control valve 32 may move between a first position at which fluid is allowed to flow into one of the first and second chambers while allowing the fluid to drain from the other of the first and second chambers to tank 30, a second position at which the flow directions are reversed, and a third neutral position at which fluid flow is blocked from both of the first and second chambers. The location of the valve element between the first, second, and third positions may determine a flow rate of the pressurized fluid into and out of the associated first and second chambers and a corresponding steering velocity (i.e., the time derivative of a steering angle) of steering mechanism 18.

Control sub-system 34 may include components in communication with steering system 17, operator station 16, and/or fraction device 14 of machine 10. In particular, control sub-system 34 may include one or more steering input sensors 42 associated with operator input device 20a and/or 20b, travel speed sensor 43 associated with traction device 14, cylinder sensors 44 associated with hydraulic cylinder 22, and/or articulation angle sensors 46 associated with the steering mechanism 18, and a controller 48 in communication with one or more of these sensors.

One or more steering input sensors 42 may monitor operation of the associated operator input device 20a, b, and generate a signal indicative of an input operation parameter. In general, input operation parameter may be any parameter related to the operation of steering input device 20, such as the position, displacement, angular velocity, angular acceleration, torque, pressure, and/or other known parameters of steering input device 20. For example, steering input sensor 42 may embody a position sensor configured to monitor a displacement angle of operator input device 20a, b and generate a corresponding displacement signal. The monitored displacement angle may be differentiated with respect to time to calculate an angular velocity. Alternatively, steering input sensor 42 could embody a velocity sensor configured to monitor angular velocity and generate a corresponding signal. In this situation, angular velocity may be integrated to determine an incremental position of operator input device 20a, b, which may then be used to calculate displacement angle. For operator input device 20a that may be a steering wheel, the displacement angle may be the angular measurement of the steering wheel displacement around a center axis of rotation. For operator input device 20b that may be a joystick, the displacement angle may be the tilt angle of the joystick relative to a neutral perpendicular axis extending through the base of the joystick.

Travel speed sensor 43 may be, for example, a magnetic pickup-type sensor. Travel speed sensor 43 may be associated with traction device 14 and/or another drive train component of machine 10, and may sense a rotation speed thereof and produce a corresponding speed signal. Alternatively, travel speed sensor 43 may embody a laser sensor, a radar sensor, or other types of speed sensing devices, which may or may not be associated with a rotating component.

Cylinder sensor 44 may be associated with hydraulic cylinder 22 to produce a signal indicative of a steering operation parameter of hydraulic cylinder 22, as hydraulic cylinder 22 extends and retracts with the supply of hydraulic fluid. In general, steering operation parameter may be any parameter related to the operation of steering mechanism 18, such as the position, displacement, angular velocity, angular acceleration, torque, pressure, and/or other known parameters of components of steering mechanism 18, such as hydraulic cylinder 22, centrally-located articulated axis 24, and/or steering linkage 47. For example, cylinder sensor 44 may produce a signal indicative of the position of extension/retraction, velocity of extension/retraction, acceleration of extension/retraction, and/or a pressure of hydraulic cylinder 22. Articulation angle sensor 46 may be associated with steering mechanism 18 to produce a signal indicative of a steering operation parameter that may include displacement, angular velocity, and/or angular acceleration of the angle between the front end of machine 10 and the back end of machine 10, in the situation where steering mechanism 18 includes a centrally-located articulated axis 24. In such example, articulation angle sensor 46 may be proximal to the centrally-located articulated axis 24 about which the front end and back end swivel. Alternatively, if hydraulic cylinder 22 is connected such that only the front wheels are articulated, articulation angle sensor 46 may be disposed proximal to one or both of the pivot joints about which traction devices 14 are steered. In such example, articulation angle sensor 46 may determine a displacement, angular velocity, and/or angular acceleration of the angle between traction device 14 and a travel direction of machine 10, or between traction device 14 and a central axis of machine 10. In other embodiments, articulation angle sensor 46 may determine a steering operation parameter, such as displacement, angular velocity, and/or angular acceleration, of an articulation angle of steering linkage 47.

Controller 48 may include a single microprocessor or multiple microprocessors that may control an operation of hydraulic circuit 26. Numerous commercially available microprocessors can be configured to perform the functions of controller 48, and controller 48 could readily embody a general machine microprocessor capable of controlling numerous machine functions. Controller 48 may include a memory, a secondary storage device, a processor, and any other components for running an application. The memory may include one or more storage devices configured to store information used by controller 48 to perform certain functions related to disclosed embodiments. The secondary storage device may include a volatile, non-volatile, magnetic, semiconductor, tape, optical, removable, non-removable, and/or other types of storage device and/or computer-readable medium. The secondary storage may store programs and/or other information, such as information related to processing data received from one or more sensors, as discussed in greater detail below. Various other circuits may be associated with controller 48, such as power supply circuitry, signal conditional circuitry, solenoid driver circuitry, and other types of circuitry.

Controller 48 may be in communication with the various components of control sub-system 34 and steering system 17. In particular, controller 48 may be in communication with steering input sensor 42, travel speed sensor 43, cylinder sensor 44, articulation angle sensor 46, steering control valve 32, and/or electric motor 36 via communication lines 50, 51, 52, 54, 56, and 58, respectively. Controller 48 may receive the steering angular displacement signal, the cylinder displacement signal, and/or the articulation angular displacement signal, as well as regulate the operation of control steering valve 32 and/or electric motor 36 in response to received signals.

For example, in response to a travel speed of machine 10 and/or a steering wheel position monitored via steering input sensor 42, controller 48 may reference a map stored in the memory thereof to determine a corresponding articulation angle of the centrally-located articulation axis 24 and/or the steering linkage 47. To achieve this corresponding articulation angle, controller 48 may send signals to steering control valve 32 and/or electric motor 36 to control the amount and or rate of flow of hydraulic fluid that is supplied to and drained from hydraulic cylinder 22. The reference map may include a collection of data in the form of tables, graphs, and/or equations. The map may define various types of relationships between one or more input operation parameters of operator input device 20 and one or more steering operation parameters of steering mechanism 18. For example, controller 48 may control the speed and/or position of steering mechanism 18 based on the speed and/or displacement angle of operator input device 20, as measured by steering input sensor 42. In particular, it may be possible for an operator input device to operate under a position input velocity control (PIVC) relationship, wherein the speed of steering or the gain associated with steering mechanism 18 may be related to a displacement of operator input device 20, as measured by steering input sensor 42. In some situations, the speed of steering may also be related to the travel velocity of machine 10, as measured by travel speed sensor 43, in addition to the displacement of operator input device 20. Another possibility may be for operator input device 20 to operate under a velocity input velocity control (VIVC) relationship, wherein a steering velocity associated with steering mechanism 18 may be related to the velocity of operator input device 20 and a gain may be associated with the travel velocity of machine 10. Yet another possibility may be for operator input device 20 to operate under a position input position control (PIPC) relationship, wherein a displacement of steering mechanism 18 may be related and/or proportional to the displacement of operator input device 20, as well as the travel velocity of machine 10.

In various embodiments, controller 48 may also provide force feedback to operator input device 20. Force feedback may be a linear force and/or torque applied to operator input device 20 by a controllable steering force feedback device 60. Steering force feedback device 60 may be, for example, inside a housing proximal to operator input device 20. Steering force feedback device 60 may include, for example, a powered actuator, such as an electric motor, drivingly connected to operator input device 20.

Controller 48 may control steering force feedback device 60 based on an error in an operation parameter of steering mechanism 18. For example, controller 48 may control steering force feedback device 60 based on an error between a desired position of steering mechanism 18 and an actual position of steering mechanism 18. Furthermore, controller 48 may control steering force feedback device 60 based on an input operation parameter of steering input device 20. In one embodiment in which steering system 17 is operated using a PIPC relationship, a given position of operator input device 20, determined based on steering input sensor 42, may correspond with a desired position of steering mechanism 18, as determined based on steering input sensor 42. However, an actual position of steering mechanism 18 may not be the same as the desired position of steering mechanism 18 due to, for example, the effect that irregularities in the road on which machine 10 is driving may have on the position of steering mechanism 18. Based on the error between the actual position of steering mechanism 18 and the desired position of steering mechanism 18, controller 48 may control steering force feedback device 60 to provide force feedback to operator input device 20.

In some embodiments, the amount of force feedback may be proportional to the error between the actual steering operation parameter of steering mechanism 18 and the desired steering operation parameter of steering mechanism 18. For example, the amount of force feedback may be proportional to the error between the actual position of steering mechanism 18 and the desired position of steering mechanism 18. This force may simulate a resistance force that is transmitted from a steering mechanism to an operator input device in conventional mechanical steering systems. Force feedback may therefore provide the operator using operator input device 20 with tactile feedback regarding road conditions of a road, on which machine 10 is operating, despite the lack of a mechanical connection between steering mechanism 18 and operator input device 20.

Controller 48 may also selectively activate the force feedback provided by steering force feedback device 60, such that force feedback is not always applied to operator input device 20. For example, when a steering operation parameter of steering mechanism 18 changes, but the operator of machine 10 has not indicated a desired change via a change in input operation parameter of operator input device 20, controller 48 may control steering force feedback device 60 to not transmit a corresponding force feedback to operator input device 20. In a further example, when a position of steering mechanism 18 changes, but the operation has not changed the position of operator input device 20, controller 48 may control steering force feedback device 60 to not transmit a corresponding force feedback to operator input device 20. In doing so, controller 48 may prevent, for example, the transmission of kickback forces from steering mechanism 18 to the operator via operator input device 20 when machine 10 suddenly comes into contact with an obstruction, obstacle, protrusion, and/or depression in the road.

Figure 3:
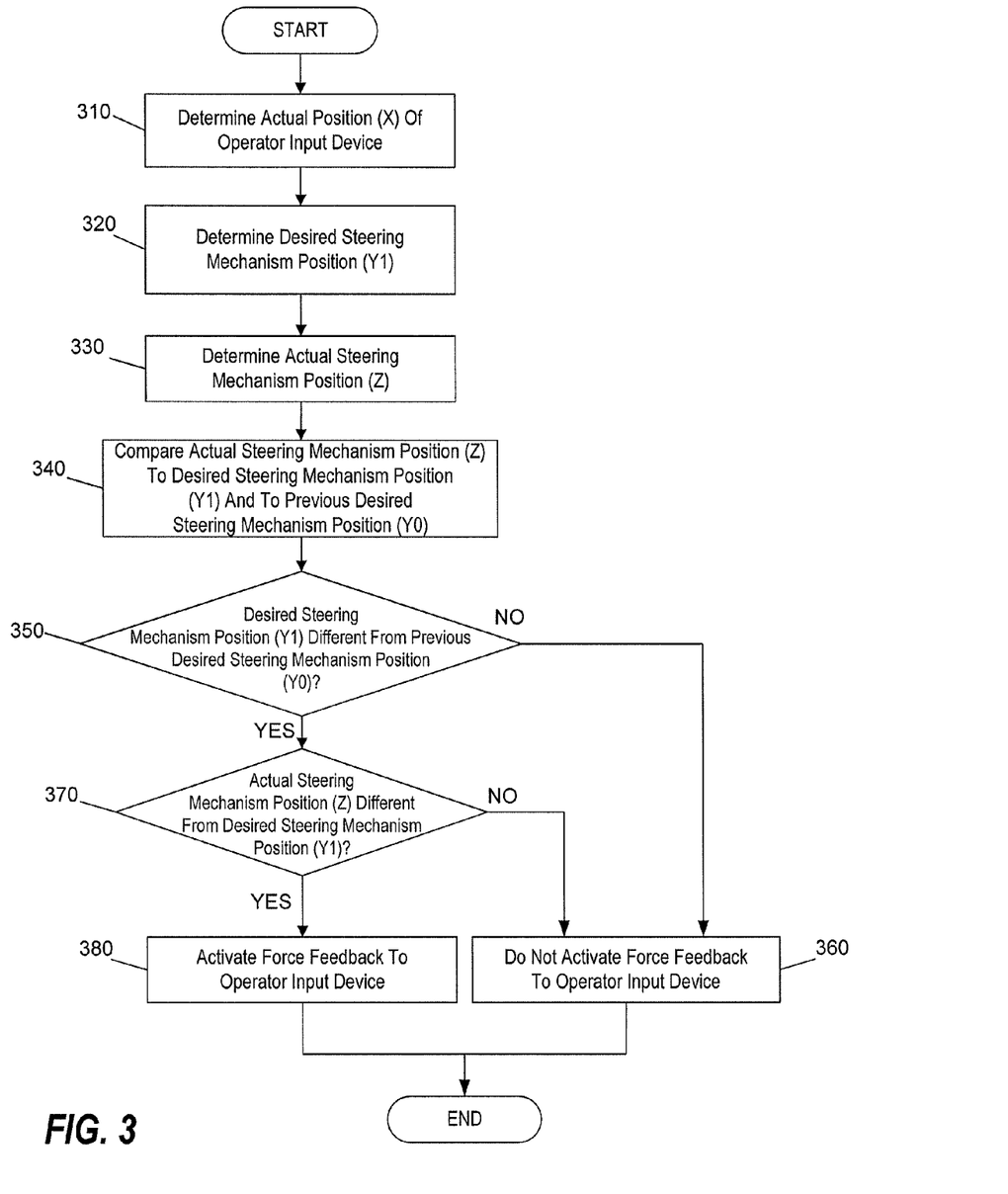
FIG. 3 is a flowchart depicting an exemplary disclosed method of operating the steering system of FIG. 2.

FIG. 3 illustrates a flow chart depicting an exemplary method used for selectively activating the force feedback on operator input device 20. FIG. 3 will be discussed in the following section to further illustrate the disclosed control system and its operation.

INDUSTRIAL APPLICABILITY

The disclosed steering system 17 may be applicable to any machine, such as machine 10, where selective activation of steering force feedback is desired. The disclosed steering system 17 may provide for this need through the use of methods described herein. The methods may be performed by controller 48. Operation of steering system 17 will now be explained with respect to FIG. 3.

FIG. 3 illustrates an exemplary embodiment of the disclosed methods, in which the input operation parameter may be the position of steering input device 20, and the steering operation parameter may be the position of a component of steering mechanism 18. However, this exemplary embodiment is not meant to be limiting. For example, the input operation parameter may be a velocity, acceleration, and/or any other known operation parameter of steering input device 20, and the steering operation parameter may be a velocity, acceleration, and/or any other known operation parameter of steering mechanism 18.

The exemplary method of steering machine 10, shown in FIG. 3, may begin with controller 48 determining an actual input operation parameter, such as an actual position (X), of operator input device 20 at Step 310. Steering input sensor 42 may detect the actual position (X) of operator input device 20, which controller 48 may then receive from steering input sensor 42. In other embodiments, steering input sensor 42 may detect a relative change from a neutral position or previous position of operator input device 20, which controller 48 may then use to resolve the actual position (X) of operator input device 20.

Controller 48 may determine a desired steering operation parameter of steering mechanism 18, such as a desired steering mechanism position (Y1), at Step 320. In some embodiments, steering mechanism position may be a displacement angle of steering linkage 47. In other embodiments, such as that of articulated steering wherein machine 10 articulates around centrally-located articulated axis 24, steering mechanism position may be an articulation angle about centrally-located articulated axis 24. In yet other embodiments, steering mechanism position may be an amount of extension and/or retraction of hydraulic cylinder 22, which corresponds to a desired linkage position and/or articulation angle. In general, in some embodiments, controller 48 may determine the desired steering operation parameter of steering mechanism 18 based on the actual input operation parameter of steering input device 20. For example, controller 48 may determine the desired steering mechanism position (Y1) based on the actual position (X) of operator input device 20. As discussed above, controller 48 may reference a map stored in the memory of controller 48, which may define a relationship between an input operation parameter of operator input device 20 and a steering operation parameter of steering mechanism 18. In one example, controller 48 may determine the desired steering mechanism position (Y1) based on the actual position (X) and the speed of machine 10 by referencing the map stored in the memory of controller 48.

At Step 330, controller 48 may determine an actual steering operation parameter, such as an actual steering mechanism position (Z). In some embodiments, controller 48 may determine the actual steering mechanism position (Z) by using cylinder sensor 44 to determine an amount of extension and/or retraction of hydraulic cylinders 22. In other embodiments, controller 48 may determine the actual steering mechanism position (Z) by using articulation angle sensor 46 to determine an articulation angle of machine 10 about centrally-located articulated axis 24, a displacement angle between traction device 14 and a travel direction of machine 10, a displacement angle between traction device 14 and a central axis of machine 10, and/or an angle of the steering linkage 47. In more general embodiments, controller 48 may determine an actual steering operation parameter by using, for example, cylinder sensor 44 to determine an extension and/or retraction, velocity, acceleration and/or pressure of hydraulic cylinders 22; an articulation angle, angular velocity, and/or angular acceleration of machine 10 about centrally-located articulated axis 24; a displacement angle, angular velocity, and/or angular acceleration between traction device 14 and a travel direction of machine 10; a displacement angle, angular velocity, and/or angular acceleration between traction device 14 and a central axis of machine 10; and/or an angle, angular velocity, and/or angular acceleration of steering linkage 47.

Furthermore, controller 48 may compare the actual steering operation parameter to the desired steering operation parameter and to a previous desired steering operation parameter. For example, at Step 340, controller 48 may compare the actual steering mechanism position (Z) to the desired steering mechanism position (Y1) and to a previous desired steering mechanism position (Y0). The previous desired steering mechanism position (Y0) may come from a previous iteration of steps of the disclosed method, for example. Based on this comparison, controller 48 may selectively activate the force feedback to operator input device 20.

For example, at Step 350, controller 48 may determine whether the desired steering mechanism position (Y1) is different from the previous desired steering mechanism position (Y0). More generally, controller 48 may determine whether the desired steering operation parameter is different from the previous desired steering operation parameter. When controller 48 determines that the desired steering mechanism position (Y1) and the previous desired steering mechanism position (Y0) are the same (Step 350, NO), controller 48 may generate a command to not activate force feedback to operator input device 20, at Step 360. For example, the desired steering mechanism position (Y1) and the previous desired steering mechanism position (Y0) being the same may indicate that the operator has not changed the position of operator input device 20. Therefore, even if the desired steering mechanism position (Y1) is different from the actual steering mechanism position (Z), force feedback may be undesired and/or unneeded. For example, the actual steering mechanism position (Z) may be different from the desired steering mechanism position (Y1) due to ground-induced forces causing the position of steering mechanism 18 to change without operator input. By generating a command to not activate force feedback to operator input device 20 at Step 360, controller 48 may prevent the transmission of such ground-induced forces (kickback) to the operator. In a situation in which the desired steering mechanism position (Y1) and the previous desired steering mechanism position (Y0) are the same, and the desired steering mechanism position (Y1) is the same as the actual steering mechanism position (Z), steering system 17 may be functioning without error (since actual steering mechanism position (Z) is tracking desired steering mechanism position (Y1)), and therefore force feedback may also be undesired and/or unneeded. More generally, when controller 48 determines that the desired steering operation parameter and the previous desired steering operation position are the same, controller 48 may generate a command to not activate force feedback to operator input device 20.

When controller 48 determines that the desired steering mechanism position (Y1) and the previous desired steering mechanism position (Y0) are different (Step 350, YES), controller 48 may determine whether the desired steering mechanism position (Y1) is different from the actual steering mechanism position (Z), at Step 370. When controller 48 determines that the actual steering mechanism position (Z) is different from the desired steering mechanism position (Y1) (Step 370, YES), controller 48 may generate a command to activate force feedback to operator input device 20 via control steering force feedback device 60, at Step 380. The amount of force feedback that controller 48 directs steering force feedback device 60 to apply to operator input device 20 may be based on various methods, maps, and/or relationships. For example, controller 48 may provide an amount of force feedback to operator input device 20 that is proportional to the error difference between desired steering mechanism position (Y1) and the actual steering mechanism position (Z). In this manner, controller 48 may provide force feedback to operator input device 20 when the desired steering mechanism position (Y1) is different from the previous desired steering mechanism position (Y0), as this difference may be due to the operator having changed the actual position (X) of operator input device 20. Furthermore, the force feedback provides tactile feedback to the operator corresponding to the change in steering that the operator has input via operator input device 20. The operator may thereby be made aware that the actual steering mechanism position (Z) does not reflect the desired steering mechanism position (Y1). In more general embodiments, when controller 48 determines that the desired steering operation parameter and the previous desired steering operation parameter are different, controller 48 may determine whether the desired steering operation parameter is different from the actual steering operation parameter. When controller 48 determines that the actual steering operation parameter is different from the desired steering operation parameter, controller 48 may generate a command to activate force feedback to operator input device 20 via control steering force feedback device 60. The amount of force feedback that controller 48 directs steering force feedback device 60 to apply to operator input device 20 may be based on various methods, maps, and/or relationships.

When controller 48 determines that the actual steering mechanism position (Z) is the same as the desired steering mechanism position (Y1) (Step 370, NO), controller 48 may generate a command to not activate force feedback to operator input device 20, at Step 360. Controller 48 may not activate force feedback because the desired steering mechanism position (Y1) being the same as the actual steering mechanism position (Z) may indicate that steering system 17 is functioning without error. That is, the actual steering mechanism position (Z) is tracking desired steering mechanism position (Y1), and therefore force feedback may be undesired and/or unneeded. In more general embodiments, controller 48 may generate a command to not activate force feedback to operator input device 20 when controller 48 determines that the actual steering operation parameter is the same as the desired steering operation parameter.

Controller 48 may iteratively perform Steps 310 to 380 at predetermined intervals, for example, on the order of ten or a hundred times a second. In other embodiments, controller 48 may perform Steps 310 to 380 more or less than tens or hundreds of times a second. Controller 48 may stop the execution of Steps 310 to 380 when selective activation of force feedback is no longer needed and/or wanted. For example, controller 48 may stop the execution of Steps 310 to 380 when machine 10 is turned off and/or when the operator of machine 10 manually inputs a signal that commands controller 48 to stop selective activation of force feedback to operator input device 20.

The disclosed steering system 17 may allow for selective activation of force feedback to operator input device 20 corresponding to movement of steering mechanism 18. Steering system 17 may allow for force feedback to be in operation in situations where the operator needs or wants tactile feedback of ground conditions, on which machine 10 is driving. Steering system 17 may additionally allow for force feedback to not be in operation in situations where kickback might occur from ground-induced forces on steering mechanism 18, thereby preventing sudden, unexpected movements in operator input device 20.

It will be apparent to those skilled in the art that various modifications and variations can be made to the disclosed steering system. Other embodiments will be apparent to those skilled in the art from consideration of the specification and practice of the disclosed steering system. For example, the disclosed methods of selective activation of force feedback to an operator input device is not limited to steering systems. The disclosed methods may be applied to other systems that employ electrohydraulic control systems. For example, the disclosed methods may be used in conjunction with machines that use hydraulically powered attachments, such as a backhoe loader, a lift loader, and/or machine with a hydraulic drill attachment. Operator input devices associated with these machines may direct the operation of such hydraulic attachments, with or without force feedback based on worksite-induced forces on the hydraulic attachments. The disclosed methods may be used to selectively activate the force feedback for such machines. It is intended that the specification and examples be considered as exemplary only, with a true scope being indicated by the following claims and their equivalents.

The invention claimed is:

1. A method for providing a force feedback to an operator input device, comprising:
   determining, via a processor, an actual input operation parameter of the operator input device;
   determining, via the processor, a desired steering operation parameter of a steering mechanism based on the actual input operation parameter of the operator input device;
   determining, via the processor, an actual steering operation parameter of the steering mechanism;
   comparing, via the processor, the actual steering operation parameter to the desired steering operation parameter and to a previous desired steering operation parameter; and
   generating, via the processor, a command that selectively activates the force feedback to the operator input device based on the comparison.

2. The method of claim 1, wherein generating the command that selectively activates the force feedback to the operator input device further includes:
   generating a command to activate the force feedback when the desired steering operation parameter is different from the previous desired steering operation parameter and when the actual steering operation parameter is different from the desired steering operation parameter.

3. The method of claim 2, wherein the force feedback that is activated is proportional to an error difference between the desired steering operation parameter and the actual steering operation parameter.

4. The method of claim 1, wherein generating the command to selectively activate the force feedback to the operator input device further includes:
   generating a command to not activate the force feedback when the desired steering operation parameter and the previous desired steering operation parameter are the same, or when the desired steering operation parameter and the previous desired steering operation parameter are different and the actual steering operation parameter and the desired steering operation parameter are the same.

5. The method of claim 1, wherein:
   the actual input operation parameter of the operator input device includes an actual position of the operator input device;
   the desired steering operation parameter of the steering mechanism includes a desired steering mechanism position;
   the actual steering operation parameter of the steering mechanism includes an actual steering mechanism position; and
   the previous desired steering operation parameter includes a previous desired steering mechanism position.

6. The method of claim 5, wherein:
   the actual position of the operator input device is determined by using one or more position sensors associated with the operator input device; and
   the actual steering mechanism position is determined by using at least one of a cylinder position sensor associated with a hydraulic cylinder configured to actuate the steering mechanism, wherein the cylinder position sensor is configured to sense a cylinder position of the hydraulic cylinder, or an articulation angle sensor associated with the steering mechanism, wherein the articulation angle sensor is configured to sense an articulation angle of the steering mechanism.

7. The method of claim 1, wherein determining the desired steering operation parameter based on the actual input operation parameter includes using a map that correlates the desired steering operation parameter with the actual input operation parameter and a speed of a machine being steered by the operator input device.

8. A force feedback control system for providing a force feedback to an operator input device, comprising:
   one or more memories storing instructions; and
   one or more processors configured to execute the instructions to perform operations, including:
      determining, via the one or more processors, an actual input operation parameter of the operator input device;
      determining, via the one or more processors, a desired steering operation parameter of a steering mechanism based on the actual input operation parameter of the operator input device;

determining, via the one or more processors, an actual steering operation parameter of the steering mechanism;

comparing, via the one or more processors, the actual steering operation parameter to the desired steering operation parameter and to a previous desired steering operation parameter; and generating, via the one or more processors, a command that selectively activates the force feedback to the operator input device based on the comparison.

9. The control system of claim 8, wherein the one or more processors are further configured to execute the instructions to perform:

generating a command to activate the force feedback to the operator input device when the desired steering operation parameter is different from the previous desired steering operation parameter and when the actual steering operation parameter is different from the desired steering operation parameter.

10. The control system of claim 9, wherein the force feedback that is activated is proportional to an error difference between the desired steering operation parameter and the actual steering operation parameter.

11. The control system of claim 8, wherein the one or more processors are further configured to execute the instructions to perform:

generating a command to not activate the force feedback to the operator input device when the desired steering operation parameter and the previous desired steering operation parameter are the same, or when the desired steering operation parameter and the previous desired steering operation parameter are different and the actual steering operation parameter and the desired steering operation parameter are the same.

12. The control system of claim 8, wherein the one or more processors are further configured to execute the instructions to perform:

determining the desired steering operation parameter based on the actual input operation parameter of the operator input device by using a map that correlates the desired steering operation parameter with the actual input operation parameter and a speed of a machine being steered by the operator input device.

13. A steering system, comprising:

an operator input device configured to control one or more traction devices of a machine;

a steering mechanism associated with the operator input device, configured to move the one or more traction devices according to the operator input device;

one or more steering input sensors associated with the operator input device; and a controller configured to provide a force feedback to the operator input device, by:

determining an actual input operation parameter of the operator input device by using the one or more steering input sensors associated with the operator input device;

determining a desired steering operation parameter of the steering mechanism based on the actual input operation parameter;

determining an actual steering operation parameter of the steering mechanism;

comparing the actual steering operation parameter to the desired steering operation parameter and to a previous desired steering operation parameter; and generating a command that selectively activates the force feedback to the operator input device based on the comparison.

14. The steering system of claim 13, wherein the controller is further configured to:

generate a command to activate the force feedback to the operator input device when the desired steering operation parameter is different from the previous desired steering operation parameter and when the actual steering operation parameter is different from the desired steering operation parameter.

15. The steering system of claim 14, wherein the force feedback that is activated is proportional to an error difference between the desired steering operation parameter and the actual steering operation parameter.

16. The steering system of claim 13, wherein the controller is further configured to:

generate a command to not activate the force feedback to the operator input device when the desired steering operation parameter and the previous desired steering operation parameter are the same, or when the desired steering operation parameter and the previous desired steering operation parameter are different and the actual steering operation parameter and the desired steering operation parameter are the same.

17. The steering system of claim 13, wherein the controller is further configured to:

determine the desired steering operation parameter based on the actual input operation parameter of the operator input device by using a map that correlates the desired steering operation parameter with the actual input operation parameter and a speed of the machine.

18. The steering system of claim 13, wherein:

the actual input operation parameter of the operator input device includes an actual position of the operator input device;

the desired steering operation parameter of the steering mechanism includes a desired steering mechanism position;

the actual steering operation parameter of the steering mechanism includes an actual steering mechanism position; and the previous desired steering operation parameter includes a previous desired steering mechanism position.

19. The steering system of claim 18, further including:

at least one of a cylinder position sensor associated with a hydraulic cylinder configured to actuate the steering mechanism, wherein the cylinder position sensor is configured to sense a cylinder position of the hydraulic cylinder, or an articulation angle sensor associated with the steering mechanism, wherein the articulation angle sensor is configured to sense an articulation angle of the steering mechanism, wherein the controller is further configured to determine the actual steering mechanism position of the steering mechanism based on the at least one of the cylinder position sensor associated or the articulation angle sensor.

20. A machine comprising the steering system of claim 13, further including:

a power source; and the one or more traction devices driven by the power source to move the machine, wherein the steering system provides steering to the one or more traction devices.

* * * * *